United States Patent [19]
Ardon

[11] Patent Number: 5,115,425
[45] Date of Patent: May 19, 1992

[54] SWITCHING SYSTEM RELIABILITY

[75] Inventor: Menachem T. Ardon, Naperville, Ill.

[73] Assignee: AT&T Bell Laboratories, Murray Hill, N.J.

[21] Appl. No.: 531,480

[22] Filed: May 31, 1990

[51] Int. Cl.$^5$ .................. H04Q 11/00; H04M 7/14
[52] U.S. Cl. .................................. 370/54; 370/16; 370/58.1; 379/221; 379/273; 379/279; 340/827
[58] Field of Search .......... 370/16, 53, 54, 58.1–58.3; 379/219–221, 269, 271–273, 242, 258, 279; 371/8.1, 8.2, 11.1; 340/825.03, 825.06, 826, 827

[56] References Cited

U.S. PATENT DOCUMENTS

| | | | |
|---|---|---|---|
| 4,322,843 | 3/1982 | Beuscher et al. | 370/63 |
| 4,550,404 | 10/1985 | Chodrow et al. | 370/110.1 |
| 4,583,218 | 4/1986 | Ardon et al. | 370/58.3 |
| 4,621,357 | 11/1986 | Naiman et al. | 370/58 |
| 4,683,584 | 7/1987 | Chang et al. | 379/269 |
| 4,754,480 | 6/1988 | Mattis et al. | 379/279 |
| 4,805,166 | 2/1989 | Ardon et al. | 370/54 |
| 4,811,388 | 3/1989 | Westerhof et al. | 379/279 |
| 4,853,957 | 8/1989 | Seeger et al. | 379/279 |
| 4,905,220 | 2/1990 | Junge et al. | 379/279 |
| 4,943,999 | 7/1990 | Ardon | 379/221 |
| 4,972,465 | 11/1990 | Cline et al. | 379/279 |
| 4,979,164 | 12/1990 | Ardon | 370/58.1 |

OTHER PUBLICATIONS

Northern Telecome Marketing Bulletins dated Oct. 12, 1989, entitled, "S/DMS Access Node Residential Fiber Access Applications", Fiber World Wire Central Consolidation, S/DMS Transport Node, S/DMS Access Node Business acess Applications, S/DMS SuperNode System, S/DMS SuperNode Remote Access in the Fiber World, Fiber World Services, Fiber World Operations, Administration, Maintenance & Provisioning, SONET Overview.
Northern Telecome Product Announcements dated Oct. 12, 1989, entitled, "Northern Telecom Introduces Sonet-Based DMS Supermode Product Family", Northern Telecom Introduces Sonet-Based Fiber Transport System, Northern Telecom Introduces Sonet-Based Fiber Access System, Background Information—The Technology Behind Fiber World.
News Release—Northern Telecom introduces "Fiberworld" Family of Fiber Optic Transmission/Switching Products—dated Oct. 12, 1989.
Copies of slides dated Oct. 10, 1989, entitled "Fiber World".
Copies of slides dated Oct. 9, 1989, and Oct. 10, 1989, entitled "The Products" by John Taylor.
Northern Telecome Introduces FiberWorld, dated Nov. 1989.
W. Leckie, et al., "Switching System Evolution: A Resource Decoupled Approach", International Switching Symposium, No. XIII, May 27–Jun. 1, 1990.
AT&T 365-301-004 "DACS IV (Digital Access and Crossconnect System IV)".
AT&T Technical Journal, Jul.-Aug., 1985, vol. 64, Part 2.

Primary Examiner—Douglas W. Olms
Assistant Examiner—Alpus H. Hsu
Attorney, Agent, or Firm—Ross T. Watland

[57] ABSTRACT

A distributed switching system where calls are processed in one of two call processing modes: 1) in a first call processing mode, available paths through a time-multiplexed switch (TMS) are selected without reference to whether the paths are presently established through the TMS, and 2) in a second call processing mode, the available path selections are made from only established paths through the TMS. Reliability is improved without an addition of hardware to the system because a transition may be advantageously effected to the second call processing mode in response to any system failure where it becomes impossible to select new TMS paths or to control their establishment, but where the established TMS paths at the time of the failure are still usable for new calls. Once such transition is completed, the system can continue to operate to complete calls between switching modules (SMs) in a reduced performance mode dependent on the number of TMS paths established between the SMs at the time of the failure.

25 Claims, 10 Drawing Sheets

FIG. 5

12
CONNECTION TABLE
STORED BY AM 14000

| SWITCHING MODULE | CHANNEL | CONNECTED TO SWITCHING MODULE |
|---|---|---|
| 13000-1 | TS0 | 13000-2 |
| 13000-1 | TS1 | 13000-N |
| ⋮ | ⋮ | ⋮ |
| 13000-1 | TS511 | NC |
| 13000-2 | TS0 | 13000-1 |
| 13000-2 | TS1 | 13000-6 |
| ⋮ | ⋮ | ⋮ |
| 13000-2 | TS511 | 13000-3 |
| ⋮ | ⋮ | ⋮ |
| 13000-N | TS0 | 13000-5 |
| 13000-N | TS1 | 13000-1 |
| ⋮ | ⋮ | ⋮ |
| 13000-N | TS511 | 13000-4 |

FIG. 6

13
AVAILABILITY BIT MAPS
STORED BY AM 14000
(0=AVAILABLE, 1=NOT AVAILABLE)

SM 13000-1

| 0 | 1 | 2 | 3 | 4 | | 511 |
|---|---|---|---|---|---|---|
| 1 | 0 | 1 | 1 | 1 | ........... | 1 |

SM 13000-2

| 0 | 1 | 2 | 3 | 4 | | 511 |
|---|---|---|---|---|---|---|
| 1 | 1 | 1 | 1 | 0 | ........... | 0 |

⋮

SM 13000-N

| 0 | 1 | 2 | 3 | 4 | | 511 |
|---|---|---|---|---|---|---|
| 1 | 0 | 1 | 0 | 1 | ........... | 0 |

FIG. 7

32
CONNECTION TABLE
STORED BY SM 13000-N

| CHANNEL | CONNECTED TO SWITCHING MODULE |
|---------|-------------------------------|
| TS0     | 13000-5                       |
| TS1     | 13000-1                       |
| ⋮       | ⋮                             |
| TS511   | 13000-4                       |

FIG. 8

33
AVAILABILITY BIT MAP
(0=AVAILABLE, 1=NOT AVAILABLE)

| 0 | 1 | 2 | 3 | 4 | ... | 511 |
|---|---|---|---|---|-----|-----|
| 1 | 0 | 1 | 0 | 1 | ... | 0   |

FIG. 15

| (FIG. 13) | (FIG. 14) |

FIG. 14

SWITCHING SYSTEM RELIABILITY

TECHNICAL FIELD

This invention relates to telecommunications.

BACKGROUND AND PROBLEM

Local switching systems process originating and terminating calls between customer lines connected to the switching system and trunks to other switching systems. Since most customer lines are connected only to a single local switching system, the availability of telecommunication service to a customer is dependent upon the continued operability of the local switching system.

Such systems are designed and constructed to provide continuing reliable service in the presence of faults. The reliability is sometimes achieved by providing identical duplicates of equipment in the more critical parts of the system. When a failing part is detected, the duplicate is placed in service and the failing part is removed. With care, the substitution of a duplicate for a failing part can occur without the loss of service to customers.

A distributed switching system is one comprised of a plurality of switch units which interface customer lines and trunks on a peripheral side of the unit and which interface a central switch arrangement on the other side of the unit. Calls between customers and/or trunks connected to different switch units are completed through the central switch. The AT&T system disclosed in the *AT&T Technical Journal*, July–August 1985, No. 6, Part Two, is a time division switching system where the switching function is distributed to a plurality of switching modules (SMs), each connected to a number of lines and/or trunks. Each SM provides connections among the lines and trunks connected to that module. Calls involving lines or trunks connected to different SMs are completed through a time-multiplexed switch (TMS) that interconnects the SMs. Each SM includes a control unit that controls the switching function of that SM. The system also includes a central control that controls the switching function of the TMS. All calls within the system require the selection of what is referred to as a network time slot. For inter-module calls, the network time slot is used for transmission from one SM, through the TMS, to another SM. The same network time slot is used for both directions of transmission. For intra-module calls, the network time slot is used within the SM to connect one line or trunk to another line or trunk. Two network time slots are used for intra-module calls, one for each transmission direction. Although the call processing function is distributed in the system in that the real-time intensive tasks associated with calls, e.g., signal processing, are performed by the switching module control units, the functions of selecting the network time slot and setting up the TMS path if the call is an inter-module call, are centralized, being performed by the central control. There are 512 channels (time slots) TS0 through TS511 between a given SM and the TMS. Setting up a path for an inter-module call between two SMs involves finding a channel that is available on the link to the first SM, for example TS44, and that has a corresponding available channel TS44 on the link to the second SM. The central control stores an availability bit map for each of the links to the SMs for use in performing the network time slot selection function. For each time slot marked not available on a given link, the central control also stores information defining the connection through the TMS to one of the other links. Network time slots are again marked available and the connection information deleted in the central control after a call ends. (For reasons of efficient processing, this operation may be deferred until a predetermined number of call disconnects, e.g., 15, occur or a predefined time elapses.) However, the path or connection through the TMS is not removed after the call ends. As described in U.S. Pat. No. 4,621,357 issued to S. Naiman et al. on Nov. 4, 1986, the TMS removes connections only as necessary to establish a new connection. The information defining established TMS connections is stored only within the TMS, and the network time slot selection function (also referred to herein as the available path selection function) is performed without reference to such information.

The three commonly assigned, copending applications of W. K. Cline et al. 07/356,823, M. T. Ardon 07/356,807, and M. T. Ardon 07/356,802 are directed to improved reliability arrangements for use in distributed switching systems such as the above-referenced AT&T system. The arrangements achieve substantially improved reliability by providing alternative means for completing inter-module calls between SMs when the TMS is unavailable. The alternative means provide inter-SM connectivity directly by way of trunks that interconnect the SMs, or indirectly via trunks connected from the SMs to a second switching office. Although such arrangements do sharply improve reliability, the costs of introducing, administering and maintaining additional trunks and modifying call processing software to route calls via those trunks are significant.

In view of the foregoing, a need exists in the distributed switching system art for an improved reliability arrangement which is more cost-effective than the trunk-based arrangements, but which still meets the enhanced reliability requirements of many switching system applications, preferably without any addition of hardware to the system.

SOLUTION

This need is met and a technical advance is achieved in accordance with the principles of the invention in an illustrative method and structural arrangement for a distributed switching system where calls are processed in one of two call processing modes: 1) in a first call processing mode, available paths through a means for selectively providing paths, e.g., a TMS, are selected, as in the above-described AT&T prior art system, without reference to whether the paths are presently established through the TMS, and 2) in a second call processing mode however, the available path selections are made from only established paths through the TMS. Reliability is improved without an addition of hardware to the system because a transition may be advantageously effected to the second call processing mode in response to any system failure where it becomes impossible to select new TMS paths or to control their establishment, but where the established TMS paths at the time of the failure are still usable for new calls. Once such transition is completed, the system can continue to operate to complete calls between SMs in a reduced performance mode dependent on the number of TMS paths established between the SMs at the time of the failure.

A call processing method in accordance with the invention is used in an arrangement, e.g., system 11000 (FIG. 4), including means for selectively providing paths, e.g., a TMS included in communications module 12000, among a number of call means, e.g., SMs 13000-1, 13000-N. For each call between first and second ones of the call means, an available path of the path providing means is selected. When a selected path is not already established through the path providing means, its establishment is effected after it is selected for a call. In a first call processing mode, the available path selection is made without reference to whether the available path is presently established through the path providing means. In a second call processing mode, the available path selection is made from only established paths between the first and second call means.

In an illustrative method, once an available path is selected, it is assigned for the call and marked unavailable. After the end of the call, the path is marked again available. Once a path is established through the TMS, it is removed only as necessary to establish a new path. A change is effected from the first to the second call processing mode in response to detection of an inability to perform selecting in the first mode as well as an inability to establish a path through the TMS, a condition referred to herein as a type 1 failure. A change is also effected from the first to the second call processing mode in response to detection of a type 2 failure, where paths may be established through the TMS but the system is unable to perform the available path selection function in the first mode.

Each of the SMs maintains stored data defining the presently established paths from that SM through the TMS, and defining the availability of the presently established paths. In the second call processing mode, the available path selections for calls between first and second SMs are made based on the stored data maintained in those SMs. For a given call, the first SM may make the selection based on the stored data maintained in the first SM, but subject to a rejection of the selection by the second SM.

In an alternative method, each SM stores a table of TMS paths to be established in the event of a type 2 failure. The defined paths may all be established after the type 2 failure is detected, or as needed in response to individual calls.

In a further alternative method, an SM does not store information defining the destination SMs for each of the established TMS paths from that SM. Upon detecting a type 1 or type 2 failure, an SM transmits a path destination request on each TMS path established from that SM. The SM determines the established paths between that SM and a second SM based on the path destination responses defining the second SM.

In an alternative arrangement, a digital networking unit (DNU) is integrated with a switching system under a common control structure, in a central office wire center CO-2000 (FIGS. 13 and 14). In a method of the invention, the available path selections made in the first call processing mode are from paths of the TMS included in the communications module (CM) of the switching system, while the selections made in the second call processing mode are from paths of the DNU. Alternatively, the available path selections made in the first call processing mode are from paths of the TMS and the DNU.

DRAWING DESCRIPTION

Figure 4:
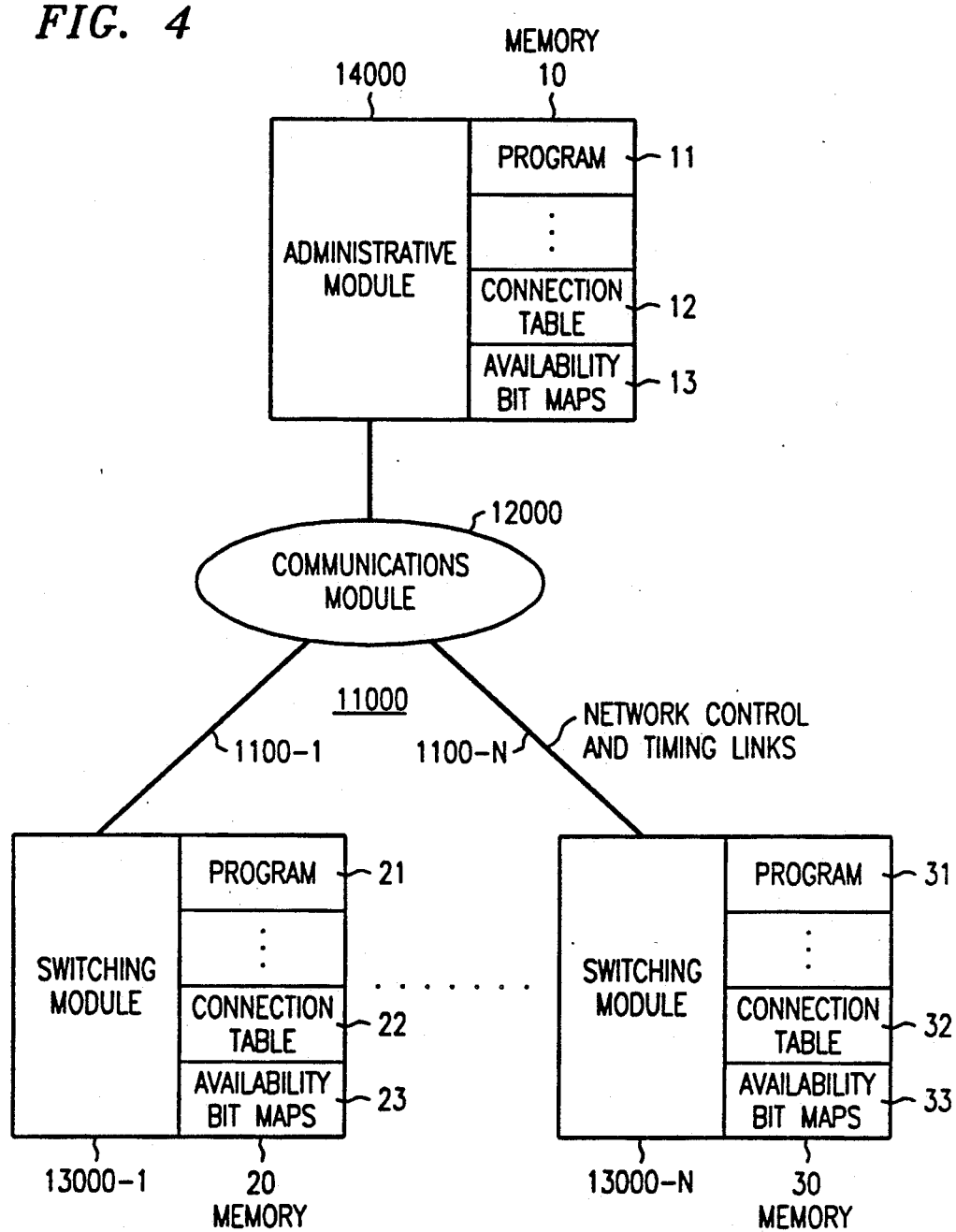
FIG. 4 is a diagram of a distributed switching system comprising an exemplary embodiment of the present invention.
Figure 9:
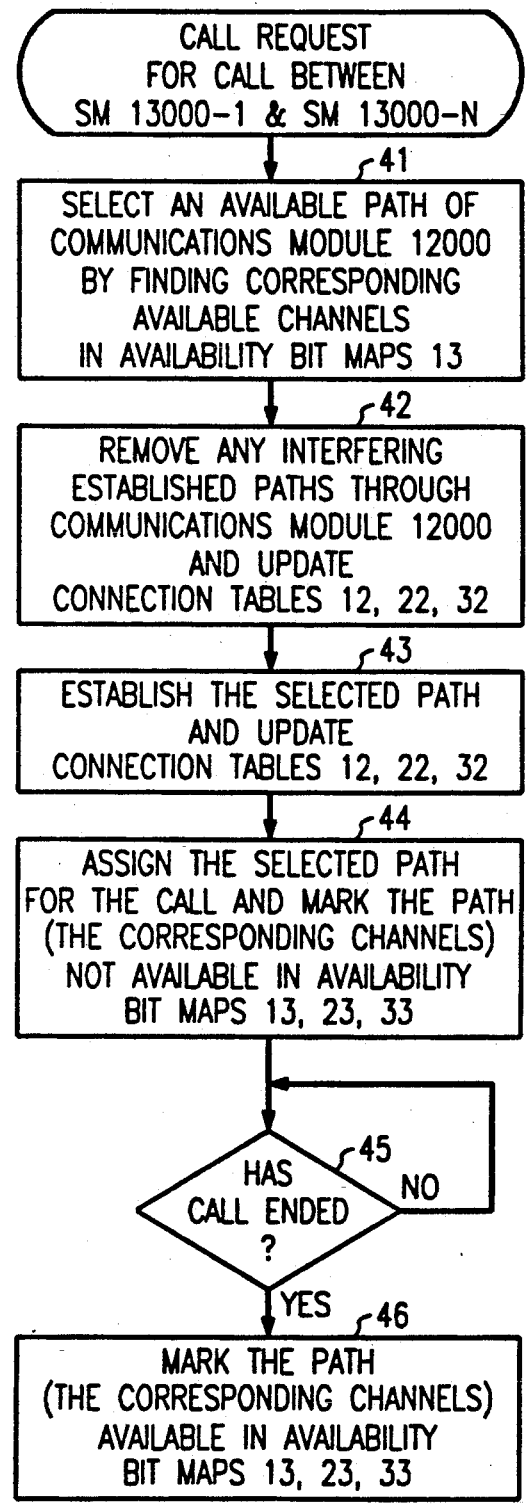
Figure 10:
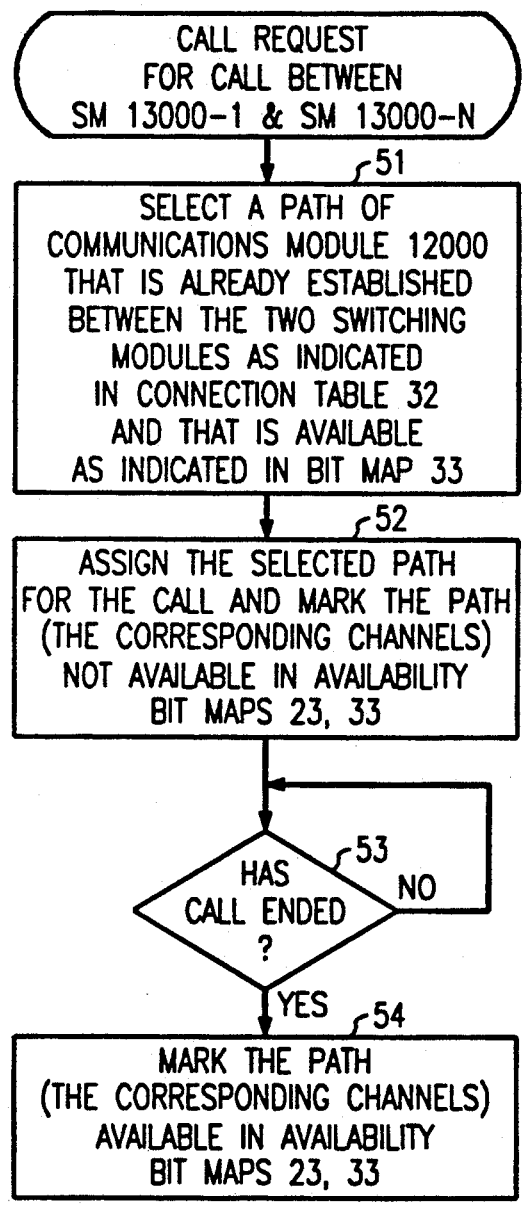
Figure 11:
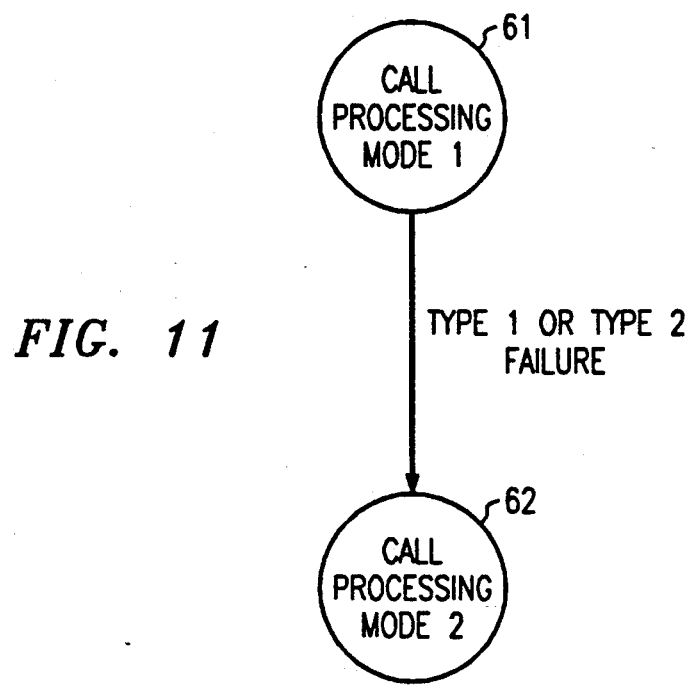
Figure 12:
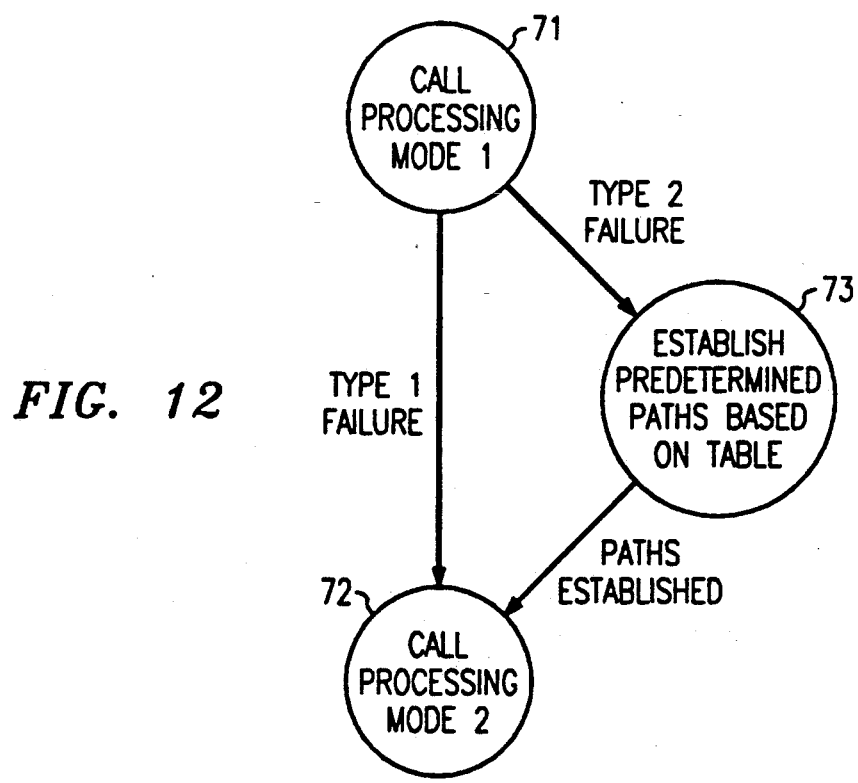
Figure 13:
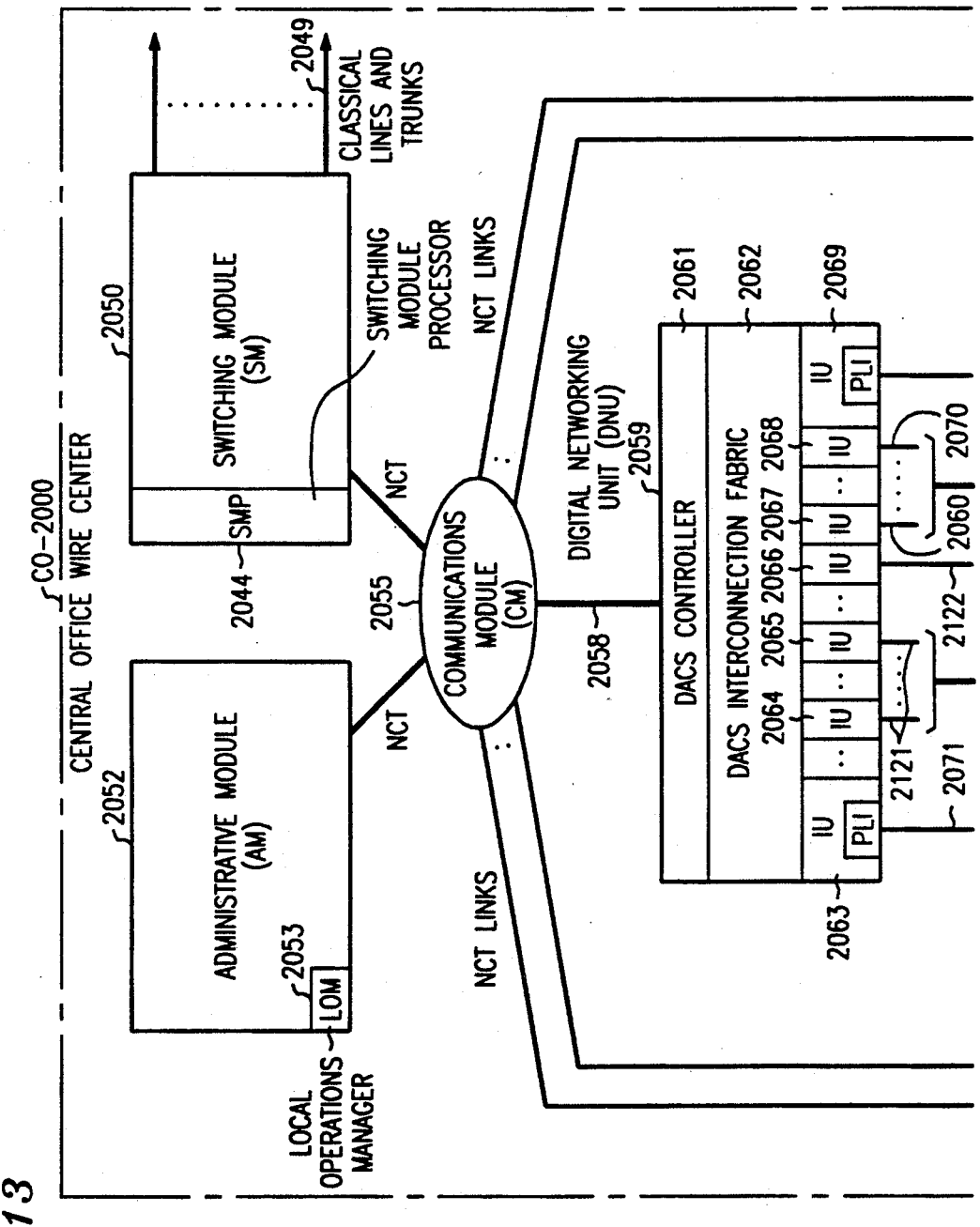

FIGS. 5 and 6 provide detail concerning memory facilities associated with an administrative module in the system of FIG. 4;

FIGS. 7 and 8 provide detail concerning memory facilities associated with a switching module in the system of FIG. 4;

FIG. 9 is a flow chart of steps for processing calls in the system of FIG. 4 in a first call processing mode;

FIG. 10 is a flow chart of steps for processing calls in the system of FIG. 4 in a second call processing mode;

FIGS. 11 and 12 are state diagrams illustrating two alternatives for transition between the first and second call processing modes in the system of FIG. 4; and FIGS. 13 and 14, arranged in accordance with FIG. 15, comprise a diagram of an alternative arrangement also employing two call processing modes in accordance with the invention.

DETAILED DESCRIPTION

The description which follows relates to call processing in a distributed switching system in accordance with two call processing modes-a first mode where paths are selected without reference to whether the paths are presently established, and a second mode where paths are selected from only presently established paths. The second mode is particularly useful to enhance reliability within distributed switching systems. The description is arranged in four parts: (1) the AT&T 5ESS ® Switch is described as it exists in the prior art; (2) call processing in an exemplary embodiment of the invention is described in terms of departures over the prior art system; (3) modifications and additions to the 5ESS Switch are described which provide the integration of an interconnection arrangement with a switching system under a common control structure, in a central office wire center CO-2000 (FIGS. 13 and 14) as described in commonly assigned copending applications 07/506,403 of M. T. Ardon et al. and 07/507,099 of J. R. Colton et al.; and (4) call processing in an alternative embodiment of the invention is described with respect to the arrangement of central office wire center CO-2000.

PRIOR ART SYSTEM 1000

Figure 1:
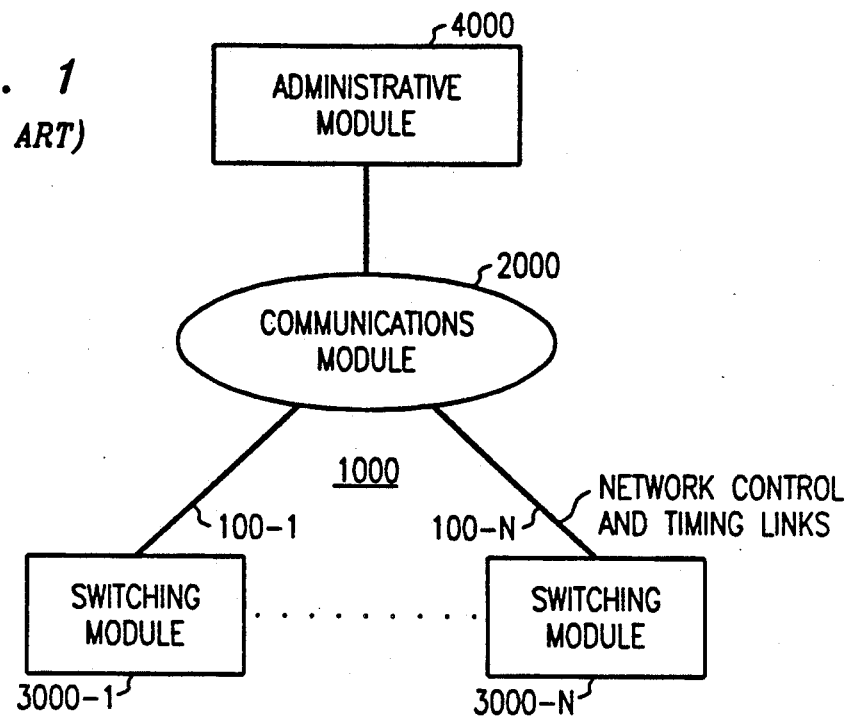
FIGS. 1-3 are diagrams of a prior art switching system.
Figure 2:
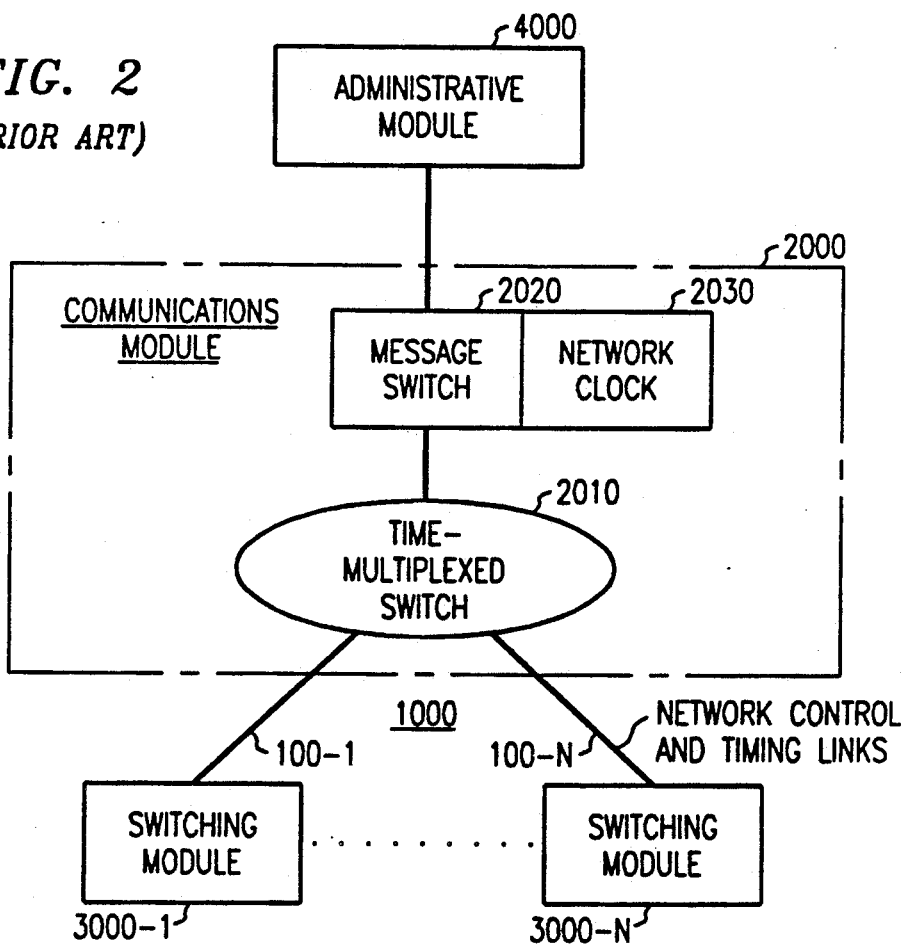
Figure 3:
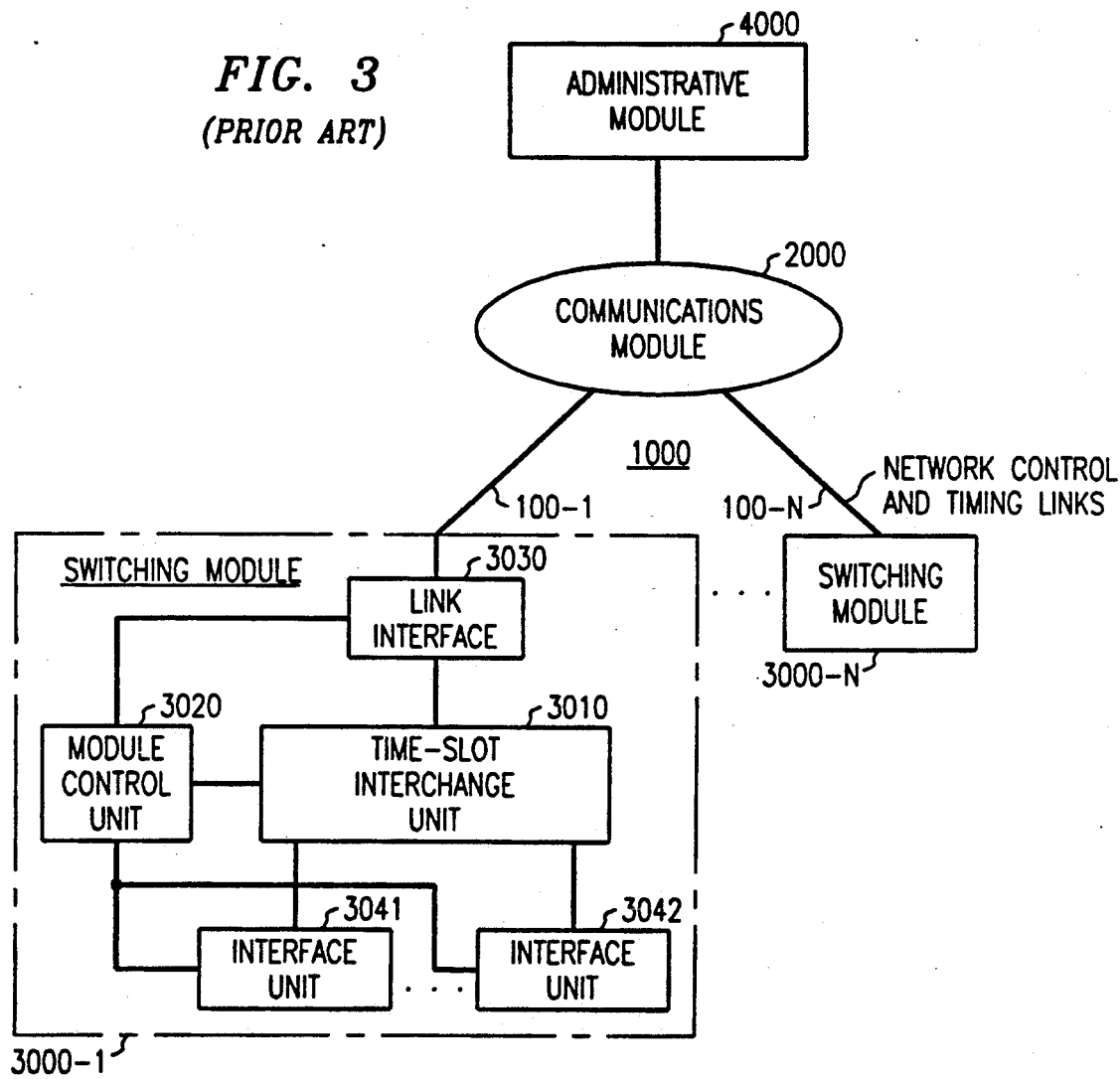

FIGS. 1-3 are used to describe the prior art switching system 1000. The AT&T Technical Journal, July-August 1985, Vol. 64, No. 6, Part 2, U.S. Pat. No. 4,322,843 issued to H. J. Beuscher et al. on Mar. 30, 1982, U.S. Pat. No. 4,683,584 issued to S. Chang et al. on Jul. 27, 1987 and U.S. Pat. No. 4,621,357 issued to S. Naiman et al. on Nov. 4, 1986 describe aspects of the system in detail.

Switching system 1000 (FIG. 1) has three major components: an administrative module (AM) 4000 that provides systemwide administration, maintenance, and resource allocation; a communications module (CM) 2000 that provides a hub for distributing and switching voice or digital data, control information, and synchronization signals; and a number of switching modules (SMs) 3000-1, 3000-N that perform local switching and control functions and that provide interfaces to subscriber lines and interexchange circuits.

AM 4000 provides the system-level interfaces required to operate, administer, and maintain system 1000. It performs functions that can most economically be done globally, such as common resource allocation and maintenance control. For reliability, AM 4000 includes fully duplicated processors and the two processors work in an active/standby configuration. In normal operation the active processor has control and, at the same time, keeps the data in the standby processor up to date. Thus when a fault occurs in the active processor, the standby processor is switched into service with no loss of data.

AM 4000 performs many call-processing support functions, including systemwide craft maintenance access, diagnostic and exercise control and scheduling, software recovery and initialization, and certain fault-recovery and error-detection functions best done on a centralized basis. Within AM 4000, there is error-checking circuitry for detecting and isolating faults. AM 4000 also performs administrative functions and provides software access to external data links and to disk storage (not shown).

The basic function of CM 2000 (FIG. 2) is to provide consistent communications between the SMs, and between AM 4000 and the SMs. A message switch (MSGS) 2020 transfers call-processing and administrative messages between the SMs and AM 4000, and between any two SMs. MSGS 2020 performs a packet-switching function within system 1000 utilizing the well-known X.25 level-2 protocol to transfer control messages through CM 2000 and its terminating network control and timing (NCT) links 100-1, 100-N. This protocol includes error detection, positive message acknowledgement, and message retransmission in the event of a transmission error. A network clock 2030 provides the clock signals that synchronize the time-division network. Clock 2030 is synchronized through an external source or runs on an internal reference basis with periodic updating.

System 1000 uses a time-space-time architecture. As illustrated in FIG. 3, a time-slot interchange unit (TSIU) in each SM performs the time-division switching; a time-multiplexed switch (TMS) 2010 in CM 2000 (FIG. 2) performs the time-shared space-division switching. At each interface unit (FIG. 3) the outputs from lines and trunks are converted into 16-bit time slots. These bits are used for signaling, control, and parity, and for binary-coded voice or data. The time slots are switched through the TSIU and time-multiplexed on NCT links to TMS 2010.

TMS 2010 (FIG. 2) is a single-stage switching network that provides the digital paths for switched connections between the modules and for control messages among modules. TMS 2010 interconnects the modules via the NCT links. Each NCT link carries 256 channels (time slots) of multiplexed data in a 32.768-Mb/s serial bit stream. One of the time slots carries control messages, and the remaining 255 time slots carry digitized voice or data. Two NCT links are associated with each switching module, thus allowing 512 time slots to be routed to and from TMS 2010. (However, only a single line 100-1 is shown in the drawing to represent both NCT links between SM 3000-1 and CM 2000.) Setting up a path between a line or trunk on two SMs involves finding an idle time slot on one of the NCT links to each SM. A path is then set up through TMS 2010 between the two NCT links using the selected time slot. The TSIU in each SM establishes a path between the selected NCT time slot and the peripheral time slot associated with the line or trunk. (Since the paths are bidirectional, one NCT time slot is needed for each direction of transmission. In the present embodiment however, the time slots for the two directions are selected to have the same number.)

One of the signaling bits of the 16-bit time slots on the NCT links to TMS 2010, referred to as the E-bit, is used for continuity verification between SMs after an inter-SM call has been set up through TMS 2010. For example, after a call between SM 3000-1 and SM 3000-N has been set up through TMS 2010 using a particular time slot, both SM 3000-1 and SM 3000-N begin transmitting a logic one E-bit in the particular time slot as a continuity signal and both also begin scanning the E-bit of the particular time slot received from the other SM. The call setup procedure is not considered complete until both SM 3000-1 and SM 3000-N have detected the E-bit continuity signal from the other SM.

SMs such as SM 3000-1 (FIG. 3) provide call-processing intelligence, the first stage of switching network, and line and trunk terminals. SMs differ in the types and quantities of interface equipment they contain, depending upon the characteristics of the lines or trunks terminating thereon. Certain equipment is however, common to all SMs. The common equipment includes a link interface 3030, a TSIU 3010, and a module control unit 3020. Link interface 3030 provides a two-way interface between each SM and TMS 2010 in CM 2000. Module control unit 3020 controls call processing, call distribution, and maintenance functions. A variety of interface units 3041, 3042 are available in system 1000. Line units provide interfaces to analog lines. Trunk units provide interfaces to analog trunks. Digital line trunk units provide interfaces to digital trunks and remote SMs, while digital carrier line units provide the interface to digital carrier systems. Integrated services line units provide interfaces to digital ISDN lines. Each SM can accommodate any mixture of these units, with up to 510 channels. Two time slots are used for control.

TSIU 3010 includes a signal processor, which handles address and signaling information and a control interface, which distributes control signals to and from the interface units. TSIU 3010 switches time slots between the interface units in an SM and connects time slots from the interface units to time slots on NCT links. TSIU 3010 switches 512 time slots—256 from each of the NCT links between SM 3000-1 and CM 2000—and 512 peripheral time slots from the interface units. TSIU 3010 can connect any of its 512 peripheral time slots to any other peripheral time slot, or to any time slot of either NCT link to CM 2000.

System 1000 is a time division switching system where the switching function is distributed to the plurality of SMs 3000-1, 3000-N, each connected to a number of lines and/or trunks. Each SM provides connections among the lines and trunks connected to that module. Calls involving lines or trunks connected to different SMs are completed through TMS 2010 that interconnects the SMs. Each SM includes a control unit, e.g., module control unit 3020, that controls the switching function of that SM. System 1000 also includes a central control, e.g., AM 4000, that controls the switching function of TMS 2010. All calls within system 1000 require the selection of what is referred to as a network time slot. For inter-module calls, the network time slot is used for transmission from one SM, through TMS 2010, to another SM. The same network time slot is used for both directions of transmission. For intra-module calls, the network time slot is used within the SM to connect one line or trunk to another line or trunk. Two network time slots are used for intra-module calls, one for each transmission direction. Although the call processing function is distributed in system 1000 in that the realtime intensive tasks associated with calls, e.g., signal processing, are performed by the switching module control units, the functions of selecting the network time slot and setting up the TMS 2010 path if the call is an inter-module call, are centralized, being performed by AM 4000.

Recall that there are 512 channels (time slots) TS0 through TS511 between a given SM and TMS 2010 (FIG. 2) and that setting up a path for an inter-module call between SM 3000-1 and SM 3000-N involves finding a channel that is available on link 100-1, for example TS44, and that has a corresponding available channel TS44 on link 100-N. AM 4000 stores an availability bit map for each of the links 100-1 through 100-N for use in performing the network time slot selection function. For each time slot marked not available on a given link, AM 4000 also stores information defining the connection through TMS 2010 to one of the other links. Network time slots are again marked available and the connection information deleted in AM 4000 after a call ends. (For reasons of efficient processing, this operation may be deferred until a predetermined number of call disconnects, e.g., 15, occur or a predefined time elapses.) However, the path or connection through TMS 2010 is not removed after the call ends. As described in the above-referenced U.S. Pat. No. 4,621,357 of S. Naiman et al., TMS 2010 removes connections only as necessary to establish a new connection. The information defining established TMS 2010 connections is stored only within TMS 2010 in system 1000, and the network time slot selection function (also referred to herein as the available path selection function) is performed without reference to such information.

EXEMPLARY EMBODIMENT OF THE INVENTION

FIG. 4 is a block diagram of distributed switching system 11000 comprising an exemplary embodiment of the present invention. System 11000 corresponds generally to the prior art system 1000 with the elements in system 11000 being numbered with numbers having an additional initial "1" with respect to the numbers of the corresponding elements of system 1000. System 11000 differs from system 1000 as described in detail herein and particularly with respect to the processing of calls in one of two call processing modes: 1) in call processing mode 1, an available path is selected for an inter-SM call through communications module (CM) 12000 (having a time-multiplexed switch (not shown) substantially identical to time-multiplexed switch 2010)) without reference to whether the available path is presently established through CM 12000, and 2) in call processing mode 2, an available path is selected for an inter-SM call through CM 12000 from only established paths through CM 12000. In the present example, call processing mode 1 is used in normal system operation, and a transition is made (FIG. 11) to call processing mode 2 in response to detection of a failure of one of two types: 1) with a type 1 failure, AM 14000 is unable to perform the network time slot or available path selection function and, in addition, no connections can be either established or removed through CM 12000, and 2) with a type 2 failure, AM 14000 is again unable to preform the network time slot or available path selection function, but any SM is able to control the establishment and removal of connections through CM 12000.

The memory facilities associated with AM 14000, SM 13000-1, and SM 13000-N are represented in FIG. 4 by memories 10, 20, and 30 respectively. In addition to storing programs, e.g., 11, 21, 31, each memory stores a connection table and one or more availability bit maps. The connection table 12 and availability bit maps 13 stored by memory 10 associated with AM 14000 are shown in FIGS. 5 and 6. Connection table 12 (FIG. 5) includes a row for each of the 512 channels TS0 through TS511 from each of the N SMs 13000-1 through 13000-N. The first row of connection table 12 shown in FIG. 5 indicates for example that channel TS0 on link 1100-1 from SM 13000-1 is connected to channel TS0 on link 1100-2 to SM 13000-2. The "NC" entry for SM 13000-1 channel TS511 indicates that no connection is presently established. It is important to note that in contrast to system 1000, the connection table 12 in system 11000 reflects all established connections through CM 12000, including those no longer being used on active calls. Connections are only removed as necessary to establish new connections. Availability bit maps 13 (FIG. 6) include one bit map comprising 512 bits for each of the N SMs 13000-1 through SM 13000-N. A "0" indicates that a given channel on the link to that SM is available for selection and assignment for a call; a "1" indicates that the channel is not available.

The connection table and availability bit maps stored by memories 20 and 30 (FIG. 4) only include information needed concerning the channels to and from the associated SM. For example, connection table 32 (FIG. 7) stored by memory 30 of SM 13000-N includes a row for each of the 512 channels TS0 through TS511 from SM 13000-N. Availability bit map 33 (FIG. 8) comprises 512 bits defining the availability status of the 512 channels from SM 13000-N. Connection table 22 and availability bit map 23 store similar information with respect to channels from SM 13000-1.

FIG. 9 is a flow chart depicting the steps involved in processing calls in call processing mode 1. Execution is initiated in response to a call request for a call between two SMs, e.g., SM 13000-1 and SM 13000-N. In block 41, an available path of CM 12000 is selected by finding corresponding available channels in the bit maps for SM 13000-1 and 13000-N stored as bit maps 13. For example, channel TS1 from SM 13000-1 and channel TS1 from SM 13000-N may be selected for a call since both are indicated as available in FIG. 6. Execution proceeds to block 42 (FIG. 9) and any interfering established paths through CM 12000 are removed. For example, channel TS1 from SM 13000-1 may be connected to channel TS1 from SM 13000-2, and channel TS1 from SM 13000-N may be connected to channel TS1 from SM 13000-3. These connections must be removed by CM 12000. Then in block 43, the selected path is established through CM 12000 by connecting channel TS1 from SM 13000-1 and channel TS1 from SM 13000-N. Also in block 43, each of the connection tables 12, 22, and 32 is updated. In block 44, the selected path is assigned for the call and marked not avilable in availability bit maps 13, 23, and 33. (Blocks 43 and 44 may be combined to minimize message communication needed to update the tables and bit maps associated with the SMs). Once the end of the call is detected in block 45, execution proceeds to block 46 and the path is again marked available in the availability bit maps 13, 23, and 33. Note that the path through CM 12000 is not removed at the end of the call nor are the connection entries changed in the connection tables 12, 22, 32. In the present embodiment, the call processing steps of mode 1 (FIG. 9) are performed by AM 14000, or alternatively by an additional central control processor (not shown) associated with communications module 12000. In an alternative embodiment, the call processing steps of mode 1 are performed cooperatively by the module control units of the SMs using the path reservation arrangement disclosed in U.S. Pat. No. 4,805,166 issued to M. T. Ardon et al. on Feb. 14, 1989.

FIG. 10 is a flow chart depicting the steps involved in processing calls in call processing mode 2. Execution is initiated in response to a call request for a call between two SMs, e.g., SM 13000-1 and SM 13000-N. In block 51, an available path of CM 12000 that is already established between the two switching modules (as indicated for example in connection table 32) is selected by finding corresponding available channels in the bit maps for SM 13000-1 and 13000-N stored as bit maps 23 and 33. In block 52, the selected path is assigned for the call and marked not available in availability bit maps 23 and 33. Once the end of the call is detected in block 53, execution proceeds to block 54 and the path is again marked available in the availability bit maps 23 and 33. In the present embodiment, the call processing steps of mode 2 (FIG. 9) are performed cooperatively by the module control units of the SMs. A handshake protocol is effected between the module control units of the two SMs involved in a inter-module call such that they do not each assign the same channel to different calls. For example, consider an inter-module call between SM 13000-1 and SM 13000-N. SM 13000-N may select the channel for the call based on the contents of connection table 32 and availability bit map 33, but subject to a rejection of the selection by SM 13000-1.

In the present embodiment, a transition is effected from call processing mode 1 (state 61, FIG. 11) to call processing mode 2 (state 62) in response to detection of either a type 1 or type 2 failure previously defined. Alternatively, a transition is effected from call processing mode 1 (state 71, FIG. 12) to call processing mode 2 (state 72) in response to detection of a type 1 failure only. When a type 2 failure is detected, a transition is effected to intermediate state 73 where predetermined paths are established between SMs in accordance with tables stored in the memories associated with the SMs. For example, a table stored in memory 20 may define that, in the event of a type 2 failure, channels TS0, TS48, TS50, TS82, . . . TS499 from SM 13000-1 should be connected to SM 13000-2, other channels should be connected to other SMs, and further channels should be left unconnected for use for intra-SM calls. Once all of the connections defined in the tables are established upon detection of a type 2 failure, a transition is effected to call processing mode 2 (state 72). Alternatively, the connections defined in the tables may be established only as needed in response to individual calls.

In the present embodiment, each SM stores a connection table defining the destination SMs that may be reached by established paths through CM 12000. In an alternative embodiment, such connection tables are not stored by the SMs in normal operation in call processing mode 1. Rather, upon detection of a type 1 or type 2 failure, each SM transmits a path destination request in each of its associated channels. SMs respond to receipt of a path destination request by returning a path destination response defining their identity in the channel in which the path destination request was received. Based on the received path destination responses, each SM stores a connection table defining established paths from that SM through CM 12000 and uses that connection table in call processing mode 2.

CENTRAL OFFICE WIRE CENTER CO-2000

Figures 14, 15:
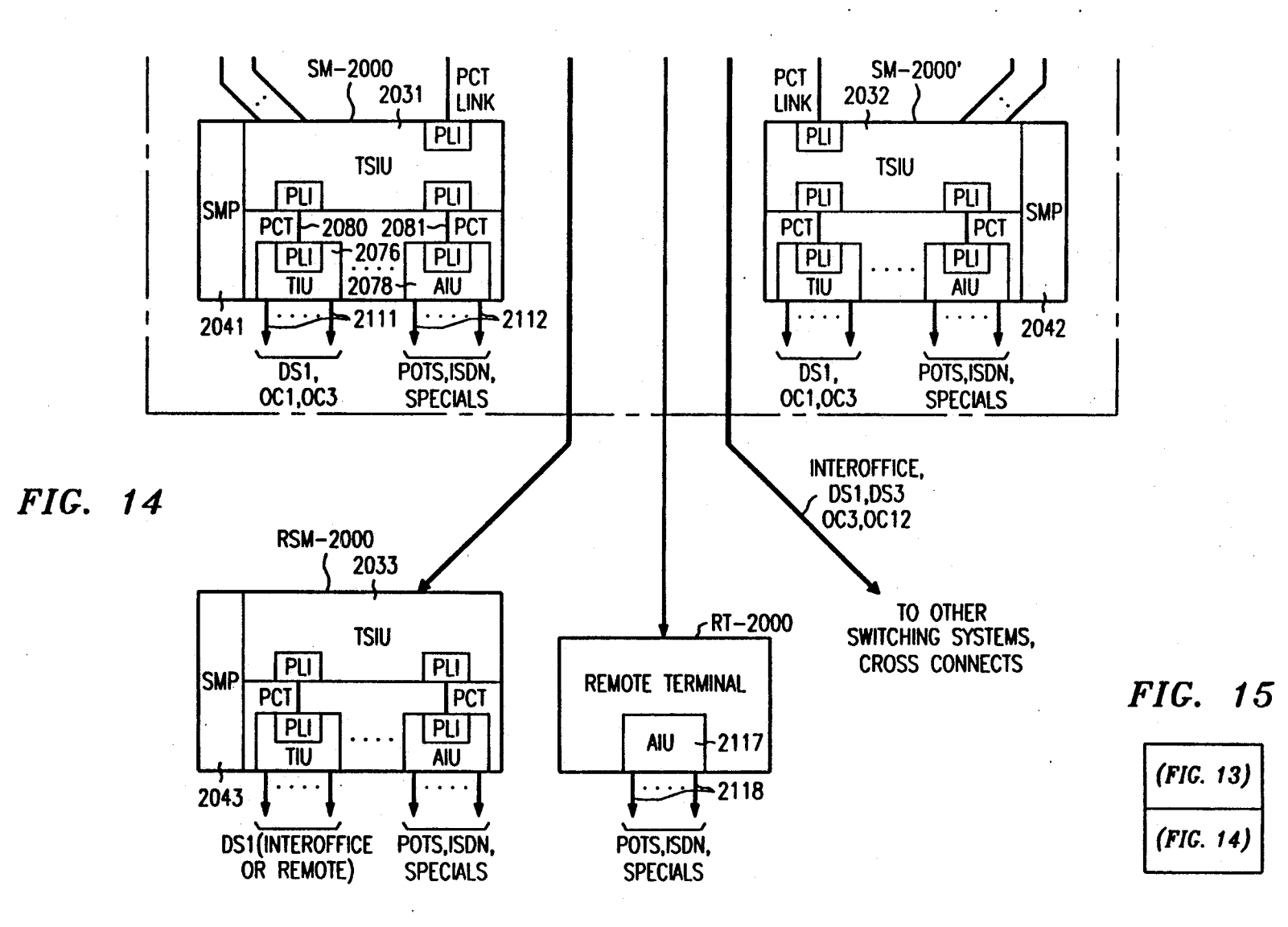

FIGS. 13 and 14 comprise a diagram of an architecture for a central office wire center CO-2000 where a switching system and a DACS are integrated under the common control of an administrative module (AM) 2052. In FIGS. 13 and 14, the DACS functionality is implemented by a digital networking unit (DNU) 2059. The other elements in FIGS. 13 and 14 are elements of a switching system based on the architecture of system 1000 (FIG. 1) but with modifications and additions as described herein.

CO-2000 includes one or more switching modules, SM-2000, SM-2000', which, like the conventional switching modules of the prior art system, perform time-switching functions under the control of a distributed module control unit or switching module processor (SMP) 2041, 2042. However, switching modules SM-2000 and SM-2000' are substantially larger than conventional switching modules and can switch approximately 16K peripheral time slots and 16K network time slots. Also included as part of the switching system is a remote switching module RSM-2000, controlled by SMP 2043, and a remote terminal RT-2000, both located at a distance from CO-2000, and intercpnnected with CO-2000 via fiber links 2121 and 2122. Conventional switching modules such as SM 2050 controlled by SMP 2044 and providing service to lines and trunks 2049, may also be included in the same system.

SM-2000 includes a time-slot interchange unit (TSIU) 2031 which switches time slots between interface units connected via peripheral control and timing (PCT) links 2080, 2081, 2071, and connects time slots from the peripheral interface units to time slots on network control and timing (NCT) links 2056 to communications module 2055. Access interface unit (AIU) 2078 provides the system interface to lines 2112 including POTS (plain old telephone service), ISDN (integrated services digital network) and special lines 2112. AIU 2078 provides the typical functionality (battery, overvoltage, ringing, supervision, coding/decoding, hybrid, testing) for analog lines, and terminates the standard B and D channels for ISDN lines. Special lines include lines to private branch exchanges, foreign exchanges, etc. Trunk unit (TIU) 2076 provides the system interface to trunks 2111 at DS1 and OC-1/OC-3 rates (Table 1). The PCT links are terminated at both ends by peripheral link interfaces (PLIs). Note that DNU 2059 is connected as a peripheral unit.

TABLE 1

| TRANSMISSION RATES |
| --- |
| DS-0 = 1 voice circuit = 64 kb/s |
| DS-1 = 24 voice circuits = 1.544 Mb/s |
| DS-3 = 672 (28 × 24) voice circuits = 44.736 Mb/s |
| OC-1 = 672 voice circuits = STS-1 = 51.84 Mb/s |
| OC-3 = 2016 (3 × 672) voice circuits = STS-3 = 155.520 Mb/s |
| OC-12 = 8064 (4 × 2016) channels = STS-12 = 622.080 Mb/s |
| VT1.5 = 1.728 Mb/s Sonet envelope containing a DS1 rate signal. |

In the present exemplary embodiment, the NCT and PCT fiber optic links transmit data at an OC-3 rate and each comprise 2016 time slots. (Alternatively, three links at an OC-1 rate may replace one link at an OC-3 rate.) The number of NCT links is engineered dependent on the amount of inter-module traffic. SM-2000 can connect any of its peripheral time slots to any other peripheral time slot, or to any of the network time slots on NCT links 2056. Within CM 2055, a given NCT link 2056 is divided into lines each comprising 256 time slots, for switching by a time-multiplexed, space-division switch to the other switching modules.

DNU 2059, based generally on the AT&T DACS IV digital access and crossconnect system described in the publication AT&T 365-301-004 "DACS IV" (Digital Access and Crossconnect System IV), includes a DACS controller 2061, which operates in response to commands from AM 2054 via CM 2055 and data link 2058, to control the operation of a DACS interconnection fabric 2062. Fabric 2062 has a plurality of ports and provides crossconnections between ports at DS1, DS3, OC-3 and OC-12 rates, for example, among interface units such as units 2063-2069. DNU 2059 is used to perform conventional crossconnection functions, performed by separate DACS systems in the prior art, such as interconnecting DS1s between other switching systems and crossconnect systems. DNU 2059 also interconnects DS1 multiplexes from transmission facilities 2060, 2070 via PCT links to SM-2000 and SM-2000' for DS0 switching. In some applications, all inter-office trunks may be received by DNU 2059 rather than by TIUs within SM-2000 or SM-2000'. DNU 2059 is also used to interconnect remote terminal RT-2000, via a fiber link 2122 in accordance with Bellcore Technical Reference TR303, with SM-2000. The number of PCT links between DNU 2059 and SM-2000 is engineered based on the required traffic.

DNU 2059 is usable to provide semi-permanent connectivity between SM-2000 and SM-2000' for use in handling some of the inter-module call traffic, without requiring the use of the individually switched connections through CM 2055. For example, in one alternative all inter-module calls are routed through DNU 2059, and CM 2055 is used only when the semi-permanent connectivity through DNU 2059 is all being used for other calls.

RT-2000 includes an AIU 2117 for interfacing POTS, ISDN, and special lines 2118 with time slots on link 2122. AIU 2117 has time slot interchange capability such that a group of 24 special lines, for example, are combined within a single DS1 multiplex on link 2122 and crossconnected by DNU 2059 with a transmission facility to another switching system, without being switched through SM-2000. Lines 2118 may include metallic and/or optical fiber lines. AIU 2117 operates as a digital loop carrier system in the manner of the AT&T SLC® carrier systems. All the circuits from RT-2000 that are to be individually switched by SM-2000 are crossconnected via fabric 2062 to interface unit 2063, which performs framing functions and terminates a derived data link for control messages from AIU 2117. Interface unit 2063 also performs overhead processing for SONET streams received via facilities 2060, 2070. The message processing from such streams is performed by SMP 2041.

RSM-2000, which is substantially identical to SM-2000, is connected via fiber links 2121 and DNU 2059 to SM-2000 which operates as a host switching module in the manner described in U.S. Pat. No. 4,550,404 issued to M. M. Chodrow et al., on Oct. 29, 1985. Alternatively, RSM-2000 may be connected directly via links 2121 to CM 2055 for operation as an optical remote module.

AM 2052 performs the functions of AM 4000 (FIG. 1) of the prior art system, and further includes a processor referred to as a local operations manager (LOM) 2053 to interface operations support systems (OSSs) for both switching systems and crossconnect systems as well as to the craft interface used in controlling, in an integrated fashion, the operations, administration, maintenance, and provisioning (OAM&P) functions, for both the switching system and the interconnect arrangement (DNU 2059).

ALTERNATIVE EMBODIMENT OF THE INVENTION

Recall that DNU 2059 is usable to provide semi-permanent connectivity between SM-2000 and SM-2000'. The present invention may also be used in central office wire center CO-2000 (FIGS. 13 and 14). A call processing mode 1 is effected by AM 2052 in wire center CO-2000 in the same manner as by AM 14000 in system 11000 as shown in FIG. 9. In response to detection of type 1 or type 2 failures, or a failure rendering CM 2055 unusable for any reason, a transition to a call processing mode 2 is effected where semi-permanent paths established through DNU 2059 are used for all inter-module calls in a similar manner to the use of established paths through CM 12000 in system 11000 as depicted in FIG. 10. The semi-permanent paths through DNU 2059 may be established in response to detection of the failure, or may have been preestablished for use in the event of failure. As a further alternative, the paths selected in call processing mode 1 may be selected from paths of CM 2055 and paths of DNU 2059, rather than only from paths of CM 2055.

It is to be understood that the above-described embodiments are merely illustrative of the principles of the invention and that many variations may be devised by those skilled in the art without departing from the spirit and scope of the invention. It is therefore intended that such variations be included within the scope of the claims.

I claim:

1. In an arrangement comprising means for selectively providing paths among a plurality of call switching means, a method of processing calls comprising
   selecting, for each call between first and second ones of said call switching means, an available path of said providing means between said first and second call switching means, and
   establishing said selected path through said providing means when said selected path is not already established,
   said selecting comprising
   in a first call processing mode, selecting said available path without reference to whether said available path is presently established through said providing means,
   in a second call processing mode, selecting said available path from only established paths of said providing means between said first and second call switching means.

2. A method in accordance with claim 1 further comprising assigning said selected path for said each call.

3. A method in accordance with claim 2 further comprising
   in response to said assigning, marking said assigned path unavailable, and
   in response to the end of said each call, marking said assigned path again available.

4. A method in accordance with claim 1 further comprising
removing an established path of said providing means only as necessary to establish a selected path through said providing means.

5. A method in accordance with claim 1 further comprising
changing from said first to said second call processing mode in response to detection of an inability to perform said selecting in said first mode.

6. A method in accordance with claim 1 further comprising changing from said first to said second call processing mode in response to detection of an inability to perform said establishing.

7. A method in accordance with claim 1 further comprising
in response to detection of an inability to perform said selecting in said first mode, establishing a predetermined plurality of paths through said providing means between said first and said second call switching means, and
after establishing said predetermined plurality of paths, performing said selecting in said second mode.

8. A method in accordance with claim 7 wherein each of said predetermined plurality of paths is established in response to a call between said first and second call switching means and remains established for use for future calls.

9. A method in accordance with claim 7 wherein said predetermined plurality of paths are established after said detection but not in response to individual calls.

10. A method in accordance with claim 1 further comprising
in response to detection of an inability to perform said selecting in said first mode, determining the established paths between said first and said second call switching means, and
after said determining, performing said selecting in said second mode.

11. A method in accordance with claim 10 wherein said determining comprises
said first call switching means transmitting a path destination request on each established path from said first call switching means through said providing means, and
said first call switching means determining said established paths between said first and second call switching means based on path destination responses defining said second call switching means transmitted from said second call switching means in response to path destination request transmitted by said first call switching means.

12. A method in accordance with claim 1 further comprising
in response to detection of an inability to perform said establishing, determining the established paths between said first and said second call switching means, and
after said determining, performing said selecting in said second mode.

13. A method in accordance with claim 12 wherein said determining comprises
said first call switching means transmitting a path destination request on each established path from said first call switching means through said providing means, and
said first call switching means determining said established paths between said first and second call switching means based on path destination responses defining said second call switching means transmitted from said second call switching means in response to path destination requests transmitted by said first call switching means.

14. A method in accordance with claim 1 further comprising
maintaining stored data defining the presently established paths through said providing means between said first and said second call switching means and the availability status of said presently established paths, and
performing said selecting in said second mode with reference to said stored data.

15. A method in accordance with claim 1 further comprising
maintaining in each of said call switching means stored data defining the presently established paths through said providing means from said each call switching means to the other ones of said call switching means and the availability of the presently established paths, and
performing said selecting in said second mode based on the stored data maintained in said first and second call switching means.

16. A method in accordance with claim 15 wherein said performing said selecting in said second mode comprises
for a given call between said first and second call switching means, said first call switching means performing said selecting in said second mode with respect to the stored data maintained in said first call switching means but subject to a rejection of said selecting in said second mode by said second call switching means.

17. A method in accordance with claim 1 wherein said providing means comprises first means for selectively providing paths among said plurality of call switching means and second means also for selectively providing paths among said plurality of call switching means, wherein said available path selected in said first mode is selected from paths of said first means, and wherein said available path selected in said second mode is selected from paths of said second means.

18. A method in accordance with claim 1 wherein said providing means comprises first means for selectively providing paths among said plurality of call switching means and second means also for selectively providing paths among said plurality of call switching means, wherein said available path selected in said first mode is selected from paths of said first and second means, and wherein said available path selected in said second mode is selected from paths of said second means.

19. In an arrangement comprising a plurality of call switching means each for communicating in an associated plurality of channels and switch means for providing switched connections among said call switching means such that each of said channels associated with any given one of said call switching means is connectable with a corresponding one of said channels associated with any other one of said call switching means, a method of processing each call between first and second ones of said call switching means comprising
in a first call processing mode, selecting a channel associated with said first call switching means that is marked idle and that has a corresponding channel associated with said second call switching means that is also marked idle, assigning for said call, marking as busy, and said switch means connecting, if not already connected, the selected channel associated with said first call switching means and the corresponding channel associated with said second call switching means, and marking again as idle the selected channel associated with said first call switching means and the corresponding channel associated with said second call switching means after the end of said each call, and in a second call processing mode, selecting a channel associated with said first call switching means that is marked idle and that is connected by said switch means to a corresponding channel associated with said second call switching means that is also marked idle, assigning for said call and marking as busy the selected channel associated with said first call switching means and the corresponding channel associated with said second call switching means, and marking again as idle the selected channel associated with said first call switching means and the corresponding channel associated with second call switching means after the end of said each call.

20. A method in accordance with claim 19 further comprising in said first call processing mode, said switch means removing the connection between the selected channel associated with said first call switching means and the corresponding channel associated with said second call switching means only as necessary to effect connection of selected channels by said switch means.

21. A method in accordance with claim 19 further comprising in said second call processing mode, retaining, for future calls between said first and second call switching means, the connection by said switch means of the selected channel associated with first call switching means and the corresponding channel associated with said second call.

22. An arrangement comprising a plurality of call switching means each for communicating during calls, means for providing paths among said plurality of call switching means, means for storing connection and availability status information for paths of said providing means, means for selecting, for each call between first and second ones of said call switching means, based on said stored connection and availability status information, an available path of said providing means between said first and second call switching means, and means for establishing said selected path through said providing means when the selected path is not already established, said selecting means being operative in a first call processing mode for selecting said available path without reference to whether said available path is presently established through said providing means, and said selecting means being operative in a second call processing mode for selecting said available path from only established paths of said providing means between said first and second call switching means.

23. An arrangement in accordance with claim 22 wherein each of of said plurality of call switching means comprises a different one of a plurality of distributed switch means of a switching system, and said providing means comprises a central switch means of said switching system, said central switch means for providing paths among said distributed switch means.

24. An arrangement in accordance with claim 22 wherein each of said plurality of call switching means comprises a different one of a plurality of distributed switch means of a switching system, and said providing means comprises a central switch means of said switching system, said central switch means for providing paths among said distributed switch means that are switchable on a per call basis, said providing means further comprising interconnect means for providing semi-permanent paths among said distributed switch means that are not switchable on a per call basis, said selecting means being operative in said first mode for selecting said available path from paths of said central switch means, and being operative in said second mode for selecting said available path from paths of said interconnect means.

25. An arrangement in accordance with claim 22 wherein each of said plurality of call switching means comprises a different one of a plurality of distributed switch means of a switching system, and said providing means comprises a central switch means of said switching system, said central switch means for providing paths among said distributed switch means that are switchable on a per call basis, said providing means further comprising interconnect means for providing semi-permanent paths among said distributed switch means that are not switchable on a per call basis, said selecting means being operative in said first mode for selecting said available path from paths of said central switch means and paths of said interconnect means, and being operative in said second mode for selecting said available path from paths of said interconnect means.

* * * * *